United States Patent Office 3,413,288
Patented Nov. 26, 1968

3,413,288
PROCESS FOR THE PRODUCTION OF STEROIDAL
C-17 SPIROLACTONES
Paul L. Creger, Ann Arbor, Mich., assignor to Parke,
Davis & Company, Detroit, Mich., a corporation of
Michigan
No Drawing. Filed July 7, 1965, Ser. No. 470,250
8 Claims. (Cl. 260—239.57)

ABSTRACT OF THE DISCLOSURE

Process for the production of 3-steroidal-propionic acid lactones, in which the steroidal grouping is 3β,17β-dihydroxyandrost-5-en-17α-yl or 17β-hydroxy-3-oxoandrost-4-en-17α-yl, by reacting 17β,20-epoxy-17α-methylandrost-5-en-3β-ol or a 3-enamine derivative of 17β,20-epoxy-17α-methylandrost-4-en-3-one with an alkali metal salt derivative of acetic acid, such as lithium lithioacetate, and subsequently hydrolyzing and acidifying the reaction mixture. The products of the process are useful as intermediates in the synthesis of spironolactone.

SUMMARY AND DETAILED DESCRIPTION

The present invention relates to a process for the production of certain steroidal lactone compounds. More particularly, the invention relates to a process for the production of steroidal lactone compounds, having the formula,

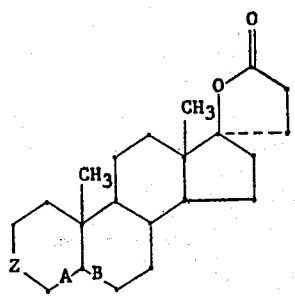

I by the reaction of a steroidal epoxide compound, having the formula,

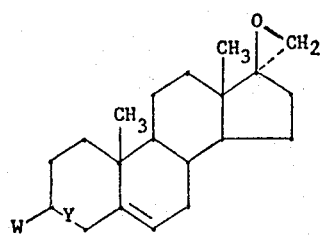

II with an alkali metal salt derivative of acetic acid, said derivative having the formula,

M—CH$_2$CO$_2$—M

III followed by hydrolysis and acidification of the reaction mixture; where M is an alkali metal cation, preferably lithium; Z represents a carbonyl (CO) or a β-hydroxymethylene (CHOH) group; A represents a double bond when Z is a carbonyl group and a single bond when Z is a β-hydroxymethylene group; B represents a single bond when Z is a carbonyl group and a double bond when Z is a β-hydroxymethylene group; W represents a hydroxyl group or an amino group having the formula

where each of R$_1$ and R$_2$ is lower alkyl or R$_1$ and R$_2$ are combined and together with the nitrogen atom to which they are attached represent a pyrrolidino, piperidino, or morpholino group; and Y represents a single bond when W is a hydroxyl group and a double bond when W is an amino group. The preferred amino group represented by W in Formula II above is the pyrrolidino group, although the precise nature of the amino group is not critical, since, during the course of the process, the amino group is removed by hydrolysis.

In accordance with the invention, a steroidal lactone compound having Formula I above is produced by the reaction of a steroidal epoxide compound having Formula II with an alkali metal salt derivative of acetic acid having Formula III in a non-hydroxylic, unreactive solvent medium at a temperature below about 150° C., followed be hydrolysis and acidification of the reaction mixture. Suitable solvents for use in the first stage of this process include aliphatic and aromatic hydrocarbons, such as n-pentane, n-hexane, n-heptane, isooctane, benzene, toluene, and xylene; ethers, such as diethyl ether, dibutyl ether, dioxane, tetrahydrofuran, and diethylene glycol dimethyl ether; tertiary amines, such as triethylamine and tributylamine; and other unreactive solvents, such as hexamethylphosphoramidate; as well as mixtures of these. A preferred solvent is a mixture of n-hexane and tetrahydrofuran. Best results are obtained when the reaction is carried out at a temperature in the range of 50–75° C., although temperatures outside this range, from room temperature to about 150° C., may also be used. The duration of the reaction is not critical and may be varied over a wide range, from about 10 minutes to 48 hours, with a period of from 10 to 20 hours being preferred. When W in the starting material of Formula II is a hydroxyl group, at least two equivalents of the alkali metal salt derivative of acetic acid are required. When W is an amino group a single equivalent of the salt derivative may be used. In both cases, however, best results are obtained when a moderate to large excess of the alkali metal salt derivative of acetic acid is employed.

Upon completion of the reaction of the first stage of the process, the reaction product mixture is hydrolyzed and acidified. The hydrolysis is accomplished by adding water to the reaction mixture and heating. The purpose of this hydrolysis step is the decomposition of any excess alkali metal salt derivative of acetic acid and the removal of the protective amino group from position 3. Following hydrolysis, the mixture is acidified with strong mineral acid to bring about the cyclization to the lactone product.

The alkali metal salt derivative of acetic acid used as a reactant in the first stage of the process is normally prepared and used in situ. The preferred reagent, lithium lithioacetate, is conveniently prepared by first reacting diisoproplyamine with n-butyl lithium in an unreactive solvent, such as n-hexane, and then reacting the lithium diisopropylamide product, without isolation, with acetic acid in the ratio of 2 equivalents of lithium diisopropylamide to one of acetic acid. Other secondary amines and lithium alkyls may also be used in this preparation.

The steroidal epoxide compounds having Formula II that are used as starting materials are prepared in a number of ways. The compound of Formula II wherein W represents a hydroxyl group is prepared by reacting a lower acyl ester of 3β-hydroxyandrost-5-en-17-one with dimethylsulfonium methylide of the formula $$(CH_3)_2S=CH_2$$

The compounds of Formula II wherein W represents an amino group as defined above can be prepared by first reacting 17β,20-epoxy-17α-methylandrost-5-en-3β-ol with a ketone in the presence of an aluminum alkoxide or an aluminum aryloxide and then reacting the 17β,20-epoxy-17α-methylandrost-4-en-3-one product with an amine having the formula

where $R_1$ and $R_2$ are as previously defined. The preparation of 17β,20-epoxy-17α-methylandrost-5-en-3β-ol and 17β,20-epoxy-17α-methylandrost-4-en-3-one is described more completely in my copending application, Ser. No. 410,729, filed Nov. 12, 1964, now U.S. Patent 3,320,242 issued May 16, 1967.

The compounds produced by the process of the invention are useful chemical intermediates. They are of value as intermediates in the synthesis of the known antialdosterone diuretic agent, spironolactone, 3-(3-oxo-7α - acetylthio - 17β - hydroxyandrost - 4 - en - 17α - yl) propionic acid lactone.

The invention is illustrated by the following examples.

Example 1

To a solution of 10.1 g. of diisopropylamine in 200 ml. of tetrahydrofuran is added 63 ml. of 1.60 M n-butyl lithium in n-hexane. The resulting solution is stirred for 10–20 minutes and a solution of 3.0 g. of glacial acetic acid in 10 ml. of tetrahydrofuran is added. To the resulting suspension is then added a solution of 3.0 g. of 17β,20-epoxy-17α-methlyandrost-5-en-3β-ol in 50 ml. of tetrahydrofuran and the reaction mixture is stirred and heated under reflux for 18 hours. After cooling, the mixture is treated successively with 100 ml. of water, 100 ml. of ethanol, and 72 ml. of 2.90 N hydrochloric acid, and is then evaporated to dryness under reduced pressure. The residue is extracted with 400 ml. of a 1:1 mixture of chloroform and ether, and the extract is washed with 50 ml. of 10% aqueous sodium carbonate, with water, is dried and evaporated under reduced pressure. The 3-(3β,17β-dihydroxyandrost-5-en-17α-yl)propionic acid lactone thus obtained is isolated and crystallized successively from aqueous ethanol and from ethyl acetate; M.P. 190–191° C.

The 17β,20-epoxy-17α-methylandrost-5-en-3β-ol used as a starting material in the foregoing procedure is prepared as follows. A mixture of 10.8 g. sodium hydride and 250 ml. dimethyl sulfoxide is heated with stirring at 65–70° C. until evolution of hydrogen ceases. The solution is diluted with 600 ml. tetrahydrofuran, cooled to −10° C., and 92 g. of trimethylsulfonium iodide is added. The resulting mixture containing dimethylfonium methylide is stirred for 5 minutes at −10° C. and then 49.5 g. 3β-acetoxyandrost-5-en-17-one is added. The mixture is stirred for 2½ hours at −10° C. and for an additional 15 minutes at 25° C. It is then chilled and diluted with 600 ml. water, with external cooling to maintain the temperature below 20° C. The diluted mixture is stirred for 10 minutes and the organic phase is separated and combined with chloroform extracts of the aqueous phase. The organic phase is washed with water, dried, and evaporated to give a residue of 17β,20-epoxy-17α-methylandrost-5-en-3β-ol; M.P. 172–176° C. following crystallization from acetonitrile.

Example 2

To a solution of 10.1 g. of diisopropylamine in 200 ml. of tetrahydrofuran is added 63 ml. of 1.60 M n-butyl lithium in n-hexane. The resulting solution is stirred for 5 minutes and a solution of 3.0 g. of glacial acetic acid in 10 ml. of tetrahydrofuran is added. After stirring and heating the resulting mixture for 15 minutes, there is added a solution of 2.90 g. of 17β,20-epoxy-17α-methyl-3-pyrrolidinoandrosta-3,5-diene in 50 ml. of tetrahydrofuran, and the reaction mixture is stirred and heated under reflux for 18 hours. Water (100 ml.) is added, the aqueous mixture is stirred and heated under reflux for 90 minutes, and, after cooling, 100 ml. more of water is added, and the organic phase is separated and discarded. The aqueous phase is washed with ether, diluted with 100 ml. of ethanol, and acidified (pH 2) with 6 N sulfuric acid. The acidified aqueous mixture is extracted with chloroform, and the chloroform extract is washed with water, dried, and evaporated. The 3-(17β-hydroxy-3-oxo-androst-4-en-17α-yl)propionic acid lactone thus obtained is crystallized successively from aqueous ethanol and from ethyl acetate; M.P. 148–150° C.

The 17β,20-epoxy-17α-methyl-3-pyrrolidinoandrosta-3,5-diene used as a starting material in the foregoing procedure is prepared as follows. A stirred mixture of 6.0 g. 17β,20-epoxy-17α-methylandrost-5-en-3β-ol, 350 ml. toluene, and 39 g. cyclohexanone is distilled until about 50 ml. is collected as a distillate. The mixture is cooled slightly and 2.0 g. aluminum isopropoxide is added. With efficient stirring, the mixture is heated at reflux for one hour, cooled, washed with a saturated aqueous solution of sodium potassium tartrate, and distilled with steam until 2 liters of distillate is collected. The remaining mixture is chilled and the insoluble product collected on a filter, washed with water, and dried. It is 17β,20-epoxy-17α-methylandrost-4-en-3-one. For purification, this product is dissolved in 1:1 isopropyl ether-hexane and the solution passed over a chromatography column prepared with alumina. The product is eluated with additional portions of 1:1 isopropyl ether-hexane and recovered by evaporation of the solvent. Following crystallizations from aqueous propanol and from isopropyl ether, it has M.P. 175–178° C. To a hot solution of 3.0 g. of 17β,20-epoxy-17α-methylandrost-4-en-3-one in 50 ml. of methanol is added with stirring 3.5 g. of pyrrolidine. The mixture is kept at room temperature for several minutes, then cooled in ice and the 17β,20-epoxy-17α-methyl-3-pyrrolidinoandrosta-3,5-diene that crystallizes is isolated, washed with cold methanol, and dried; M.P. 171–177° C., suitable for use without further purification.

I claim:

1. Process for the production of steroidal lactone compounds, having the formula,

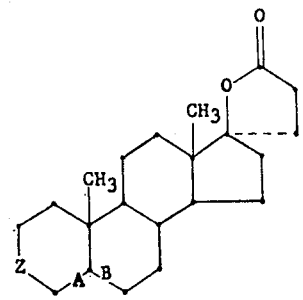

which cmoprises the reaction of a steroidal expoxide compound, having the formula,

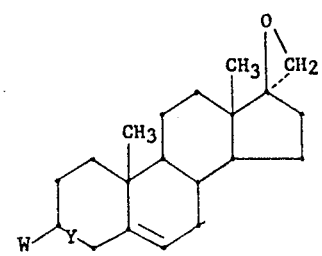

with an alkali metal salt derivative of acetic acid, said derivative having the formula,

M—CH$_2$CO$_2$—M followed by hydrolysis and acidification of the reaction mixture; where M represents an alkali metal cation; Z is a member of the class consisting of carbonyl and β-hydroxymethylene groups; A and B are members of the class consisting of a double bond and a single bond; Z, A and B are selected to constitute one of the following combinations:

Z=carbonyl
A=double bond
B=single bond

Z=β-hydroxymethylene
A=single bond
B=double bond

W is a member of the class consisting of a hydroxyl group and an amino group, having the formula,

where R$_1$ and R$_2$ are chosen from the class consisting of lower alkyl and further members wherein R$_1$ and R$_2$ are combined and together with the nitrogen atom to which they are attached represent a heterocyclic ring chosen from among pyrrolidino, piperidino, and morpholino; Y is a member of the class consisting of a double bond and a single bond; and W and Y are selected to constitute one of the following combinations:

W=hydroxyl
Y=single bond

W=amino group
Y=double bond

2. Process according to claim 1 wherein M is a lithium cation.

3. Process for the production of 3-(3β,17β-dihydroxyandrost-5-en-17α-yl)propionic acid lactone which comprises the reaction of 17β,20-epoxy-17α-methylandrost-5-en-3β-ol with an alkali metal salt derivative of acetic acid, said derivative having the formula,

M—CH$_2$CO$_2$—M followed by hydrolysis and acidification of the reaction mixture; where M represents an alkali metal cation.

4. Process according to claim 3 wherein M is a lithium cation.

5. Process for the porduction of 3-(17β-hydroxy-3-oxoandrost-4-en-17α-yl)propionic acid lactone which comprises the reaction of a steroidal expoxide compound, having the formula,

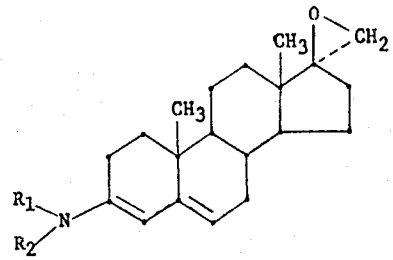

with an alkali metal salt derivative of acetic acid, said derivative having the formula

M—CH$_2$CO$_2$—M followed by hydrolysis and acidification of the reaction mixture; where M represents an alkali metal cation and R$_1$ and R$_2$ are chosen from the class consisting of lower alkyl and further members wherein R$_1$ and R$_2$ are combined and together with the nitrogen atom to which they are attached represent a heterocyclic ring chosen from among pyrrolidino, piperidino, and morpholino.

6. Process according to claim 5 wherein M is a lithium cation.

7. Process for the production of 3-(17β-hydroxy-3-oxoandrost-4-en-17α-yl)propionic acid lactone which comprises the reaction of 17β,20-epoxy-17α-methyl-3-pyrrolidinoandrosta-3,5-diene with an alkali metal salt derivative of acetic acid, said derivative having the formula,

M—CH$_2$CO$_2$—M followed by hydrolysis and acidification of the reaction mixture; where M represents an alkali metal cation.

8. Process according to claim 7 wherein M is a lithium cation.

References Cited
UNITED STATES PATENTS 3,300,489   1/1967   Holden _____ 260—239.57

LEWIS GOTTS, *Primary Examiner.*

E. G. LOVE, *Assistant Examiner.*